US008101243B2

(12) United States Patent
Way et al.

(10) Patent No.: US 8,101,243 B2
(45) Date of Patent: Jan. 24, 2012

(54) METHOD OF MAKING SULFUR-RESISTANT COMPOSITE METAL MEMBRANES

(75) Inventors: J. Douglas Way, Boulder, CO (US); Mark Lusk, Golden, CO (US); Paul Thoen, Littleton, CO (US)

(73) Assignee: Colorado School of Mines, Golden, CO (US)

( * ) Notice: Subject to any disclaimer, the term of this patent is extended or adjusted under 35 U.S.C. 154(b) by 1140 days.

(21) Appl. No.: 11/768,188

(22) Filed: Jun. 25, 2007

(65) Prior Publication Data
US 2008/0038567 A1 Feb. 14, 2008

Related U.S. Application Data

(60) Continuation-in-part of application No. 11/381,488, filed on May 3, 2006, which is a division of application No. 10/249,387, filed on Apr. 3, 2003, now abandoned.

(60) Provisional application No. 60/369,674, filed on Apr. 3, 2002, provisional application No. 60/805,723, filed on Jun. 23, 2006.

(51) Int. Cl.
*B05D 5/00* (2006.01)
*B05D 7/14* (2006.01)
*B05D 3/10* (2006.01)

(52) U.S. Cl. .................. 427/404; 427/383.1; 427/437; 427/443.1

(58) Field of Classification Search .................. 427/404, 427/383.1, 437, 443.1
See application file for complete search history.

(56) References Cited

U.S. PATENT DOCUMENTS

| | | | |
|---|---|---|---|
| 2,773,561 A | 12/1956 | Hunter | |
| 3,350,845 A | 11/1967 | McKinely | |
| 3,439,474 A | 4/1969 | McKinely | |
| 3,849,076 A | 11/1974 | Gryaznov et al. | |
| 3,881,891 A | 5/1975 | Goltsov et al. | |
| 4,179,470 A | 12/1979 | Mischenko et al. | |
| 4,313,013 A | 1/1982 | Harris | |
| 4,343,013 A | 8/1982 | Bader et al. | |
| 4,911,803 A | 3/1990 | Kunz | |
| 5,139,541 A | 8/1992 | Edlund | |
| 5,149,420 A | 9/1992 | Buxbaum et al. | |
| 5,215,729 A | 6/1993 | Buxbaum | |
| 5,451,386 A | 9/1995 | Collins et al. | |
| 5,498,278 A | 3/1996 | Edlund | |
| 5,518,053 A | 5/1996 | Robison | |
| 5,518,530 A | 5/1996 | Sakai et al. | |
| 5,645,626 A | 7/1997 | Edlund et al. | |
| 5,652,020 A | 7/1997 | Collins et al. | |
| 5,738,708 A | 4/1998 | Peachey et al. | |
| 5,888,273 A | 3/1999 | Buxbaum | |
| 5,904,754 A | 5/1999 | Juda et al. | |
| 5,931,987 A | 8/1999 | Buxbaum | |
| 5,980,989 A | 11/1999 | Takahashi et al. | |
| 5,997,594 A | 12/1999 | Edlund et al. | |
| 6,086,729 A | 7/2000 | Bredesen et al. | |
| 6,103,028 A | 8/2000 | Juda et al. | |
| 6,152,984 A | 11/2000 | Drnevich | |
| 6,152,987 A | 11/2000 | Ma et al. | |
| 6,152,995 A | 11/2000 | Edlund | |
| 6,168,650 B1 | 1/2001 | Buxbaum | |
| 6,171,574 B1 | 1/2001 | Juda et al. | |
| 6,183,543 B1 | 2/2001 | Buxbuam | |
| 6,214,090 B1 | 4/2001 | Dye et al. | |
| 6,221,117 B1 | 4/2001 | Edlund et al. | |
| 6,238,465 B1 | 5/2001 | Juda et al. | |
| 6,267,801 B1 | 7/2001 | Baake et al. | |
| 6,319,306 B1 | 11/2001 | Edlund et al. | |
| 6,372,363 B1 | 4/2002 | Krueger | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,416,729 B1 | 7/2002 | DeBerry et al. | |
| 6,419,728 B1 | 7/2002 | Edlund | |
| 6,451,464 B1 | 9/2002 | Edlund et al. | |
| 6,458,189 B1 | 10/2002 | Edlund et al. | |
| 6,461,408 B2 | 10/2002 | Buxbaum | |
| 6,465,118 B1 | 10/2002 | Dickman et al. | |
| 6,494,937 B1 | 12/2002 | Edlund et al. | |
| 6,495,227 B1 | 12/2002 | Cahuzac | |
| 6,537,352 B2 | 3/2003 | Edlund et al. | |

(Continued)

FOREIGN PATENT DOCUMENTS

EP 0783919 7/1997

(Continued)

OTHER PUBLICATIONS

Collins et al., "Preparation and Characterization of a Composite Palladium-Ceramic Membrane," Ind. Eng. Chem. Res. 1993, 32, 3006-3013.*
Kajiwara et al., "Stability and hydrogen permeation behavior of supported platinum membranes in presence of hydrogen sulfide," International Journal of Hydrogen Energy 24 (1999) 839-844.*
Cheng et al., "Effects of electroless plating chemicsrty on the synthesis of palladium membranes," Journal of Membrane Science 182 (2001) 195-203.*
International Search Report for PCT patent application No. PCT/US07/72061, mailed Jan. 29, 2008.
Written Opinion for PCT patent application No. PCT/US07/72061, mailed Jan. 29, 2008.

(Continued)

*Primary Examiner* — William Phillip Fletcher, III
(74) *Attorney, Agent, or Firm* — Sheridan Ross, P.C.

(57) ABSTRACT

The invention provides thin, hydrogen-permeable, sulfur-resistant membranes formed from palladium or palladium-alloy coatings on porous, ceramic or metal supports. Also disclosed are methods of making these membranes via sequential electroless plating techniques, wherein the method of making the membrane includes decomposing any organic ligands present on the substrate, reducing the palladium crystallites on the substrate to reduced palladium crystallites, depositing a film of palladium metal on the substrate and then depositing a second, gold film on the palladium film. These two metal films are then annealed at a temperature between about 200° C. and about 1200° C. to form a sulfur-resistant, composite PdAu alloy membrane.

17 Claims, 1 Drawing Sheet

U.S. PATENT DOCUMENTS

| | | | |
|---|---|---|---|
| 6,540,813 | B2 | 4/2003 | Nelson et al. |
| 6,541,676 | B1 | 4/2003 | Franz et al. |
| 6,562,111 | B2 | 5/2003 | Edlund et al. |
| 6,569,227 | B2 | 5/2003 | Edlund et al. |
| 6,576,350 | B2 | 6/2003 | Buxbaum |
| 6,596,057 | B2 | 7/2003 | Edlund et al. |
| 6,649,559 | B2 | 11/2003 | Drost et al. |
| 6,761,929 | B2 | 7/2004 | Damle |
| 6,916,454 | B2 | 7/2005 | Alvin |
| 2003/0190486 | A1 | 10/2003 | Roa |
| 2005/0109609 | A1 | 5/2005 | Rei et al. |
| 2006/0093848 | A1 | 5/2006 | Senkevich et al. |
| 2006/0188737 | A1 | 8/2006 | Roa et al. |

FOREIGN PATENT DOCUMENTS

| | | |
|---|---|---|
| EP | 1096026 | 5/2001 |
| JP | 36-294925 | 1/1988 |
| JP | 63-294925 | 12/1988 |
| JP | 63295402 | 12/1988 |
| JP | 8-266876 | 10/1996 |
| JP | 9-029079 | 2/1997 |
| JP | 10-203802 | 8/1998 |
| WO | WO 01/53005 | 7/2001 |

OTHER PUBLICATIONS

Amandusson, et al., "The effect of CO and $O_2$ on hydrogen permeation through a palladium membrane", Applied Surface Science, 2000, vol. 153, pp. 259-267.

Brey, et al., "Hydrogen as an energy carrier and its production by nuclear power", International Atomic Energy Agency, 1999, IAEA-TECDOC-1085, Vienna Austria, pp. 1-348.

Dolan, et al., Composition and operation of hydrogen-selective amorphous alloy membranes, Journal of Membrane Science, 2006, vol. 285, pp. 30-55.

Doyle, et al., "The Influence of intercystalline defects on hydrogen activity and transport in nickel", Acta Metallurgica et Materialia, 1995, vol. 43, No. 8, pp. 3027-3033.

Gade, et al., "Fabrication of Unsupported Palladium-Alloy Dfilms by Electroless Plating", Prepr. Pap.-Am. Chem. Soc., Div. Fuel Chem. 2007, vol. 52, No. 2, pp. 661-662.

U.S. Appl. No. 12/197,218, filed Aug. 22, 2008, Way, et al.

Gade, et al., "Unsupported palladium allow foil membranes fabricated by electroless plating", Journal of Membrane Science, 2008, vol. 316, pp. 112-118.

Kueler, et al., "Characterization of electroless plated palladium-silver alloy membranes", Thin Solid Films, 1999, vol. 347, pp. 91-98.

Keuler, et al., "Developing a heating procedure to optimise hydrogen permeance through Pd-Ag membranes of thickness less than 2.2µm", Journal of Membrane Science, 2002, vol. 195, pp. 203-213.

Kajiwara, et al., "Stability and hydrogen permeation behavior of supported platinum membranes in presence of hydrogen sulfide", International Journal of Hydrogen Energy, 1999, vol. 24, p. 839-844.

Kulprathipanja, et al., Pd and Pd-Cu membranes: Inhibition of $h_2$ permeation by $H_2S$, Journal of Membrane Science, 2005, vol. 254, pp. 49-62.

Lemier, et al., "Grain boundary segregation, stress and stretch: Effects on hydrogen absorption in nanocrystalline palladium", Acta Materialia, 2007, vol. 55, pp. 1241-1254.

Li, et al, The effect of carbon monoxide and steam on the hydrogen permeability of a Pd/stainless steel membrane, Journal of Membrane Science, 2000, vol. 165, pp. 135-141.

Morreale, et al.,"The Permeability of Hydrogen in Bulk Palladium at Elevated Temperatures and Pressures", Journal of Membrane Science, 2003, vol. 212, pp. 87-97.

Paglieri, et al., "Innovations in palladium membrane research", Separations and Purification Methods, 2002, vol. 31, No. 1, pp. 1-169.

Di Pascasio, et al., "$H_2$ plasma for hydrogen loading in Pd", Intermetallics, 2003, vol. 11, pp. 1345-1354.

Zhang, et al., "High Temperature PEM Fuel Cells", Journal of Power Sources, 2006, vol. 160, pp. 872-891.

International Preliminary Report on Patentability for International (PCT) Patent Application No. PCT/US07/72061, issued Jan. 6, 2009.

Aggarwal et al., "Spontaneous Ordering of Oxide Nanostructures", Science, Mar. 24, 2000, pp. 2235-2237, 287, The American Association for the Advancement of Science, USA.

Alefeld et al. (eds), Hydrogen in Metals I: Basic Properties, 1978, pp. 324-326, 342-348, 1, Springer-Verlag, Berlin, Germany.

Ali et al., "Irreversible Poisoning of Pd-Ag Membranes", International Journal of Hydrogen Energy, 1994, pp. 877-880, 19-#11, Elsevier Science Ltd., London, UK.

Armor "Applications of Catalytic Inorganic Membrane Reactors to Refinery Products", Journal of Membrane Science, 1998, pp. 217-233, 147, Elsevier Science B.V., Amsterdam, The Netherlands.

Armor, "Membrane Catalysis: Where Is It Now, What Needs to Be Done?", Catalysis Today, 1995, pp. 199-207, 25 Elsevier Science B.V., Amsterdam, The Netherlands.

Barbieri et al., "Methane Steam Reforming Analysis in a Palladium-Based Catalytic Membrane Reactor", Industrial & Engineering Chemistry Research, 1997, pp. 3396-3374, 36, American Chemical Society, Washington, DC, USA.

Benesi et al., "Preparation of Highly Dispersed Catalytic Metals: Platinum Supported on Silica Gel", Journal of Catalyis, 1968, pp. 328-335, 10, Academic Press, London, UK.

Berseneva et al., "Alloys of Palladium With Metals of the Platinum Group as Hydrogen-Permeable Membrane components at High Temperature of Gas Separation", International Journal of Hydrogen Energy, 1993, pp. 15-18, 18-#1, Pergamon Press Ltd., Great Britian.

Buxbaum et al., "Hydrogen Transport Through Tubular Membranes of Palladium-Coated Tantalum and Niobium", Industrial & Engineering Chemistry Research, 1996, pp. 530-537, 35, American Chemical Society, Washington, DC, USA.

Collins et al., "Catalytic Dehydrogenation of Propane in Hydrogen Permselective Membrane Reactors", Industrial & Engineering Chemistry Research, 1996, pp. 4398-4405, 35-#12, American Chemical Society, Washington, DC, USA.

Collins et al., "Preparation of Characterization of a Composite Palladium-Ceramic Membrane", Industrial & Engineering Chemistry Research, 1993, pp. 3006-3013, 32-#12, American Chemical Society, Washington, DC, USA.

Criscuoli et al., "An Economic Feasibility Study for Water Gas Shift Membrane Reactor", Journal of Membrane Science, 2001, pp. 21-27, 181, Elsevier Science B.V., Amsterdam, The Netherlands.

Dorling et al., "The Structure and Activity of Supported Metal Catalysts", Journal of Catalysis, 1971, pp. 190-201, 20, Academic Press, London, UK.

Edlund, "A Membrane Reactor for H2S Decomposition", FETC 1996 Conference Proceedings: Advanced Coal-Fired Power Systems '96 Review Meeting, Morgantown, West Virginia, Jul. 16-18, 1996, p. 1-9, U.S. Department of Energy, Office of Fossil Energy, USA.

Fisher et al., "Psolution of Hydrogen in Palladium/Copper Alloys", Journal of Solid State Chemistry, 1977, pp. 149-158, 20, Academic Press Inc., Great Britain.

Flanagan et al. "Solubility of Hydrogen (1 atm, 298 K) in Some Copper/Palladium Alloys", Solid State Communications, 1975, pp. 529-532, 16 Pergamon Press, Great Britain.

Foley et al., "Effect of a Model Hydrogenation on a Catalytic Palladium Membrane", Selectivity in Catalysis, 1993, pp. 168-184, American Chemical Society—published by Oxford University Press, UK.

Foo "Chapter 4: Preparation and Characterization of a Composite Palladium-Gold Ceramic Membrane" and "Chapter 5: Conclusions and Recommendations", Hydrogen Separation in Palladium Ceramic Membranes and Palladium-Gold Ceramic Membranes, 1995, pp. 71-90, Colorado School of Mines, Golden, USA.

Grashoff et al., "The Purification of Hydrogen—A Review of the Technology Emphasising the Current Status of Palladium Membrane Diffusion", Platinum Metals Review, 1982, pp. 157-169, 27-#4, Johnson Matthey PLC, London, UK.

Gryaznov et al., "Palladium-Ruthenium Alloys as Membrane Catalysts", Dokl. Akad. Nauk SSSR, Jul. 1973, pp. 624-627, 211-#3, Russian Academy of Sciences, Moscow, Russia.

Gryaznov et al., "Hydrogen Permeability of Some Metallopolymer Membranes", Polymer Science, 1993, pp. 365-368, 35-#3, Russian Academy of Sciences, Moscow, Russia.

Gryaznov, "Membrane Catalysts", Catalysis Today, 1999, pp. 391-395, 51, Elsevier Science B.V., Amsterdam, The Netherlands.

Hollein et al. "Preparation and characterization of palladium composite membranes for hydrogen removal in hydrocarbon dehydrogenation membranes reactors", Catalysis Today 67 (2001), p. 33-42.

Hughes et al., "A Comparative Study of Hydrogen Permeabilities and Solubilities in Some Palladium Solid Solution Alloys", Journal of Less-Common Metals, 1978, pp. P9-P21, 61, Elsevier Sequois A.A., Lausanne, The Netherlands.

Hunter, "A New Hydrogen Purification Process", Platinum Metals Review, 1960, pp. 130-131, 4, Johnson Matthey PLC, London, UK.

Jayaraman et al., "Fabrication of Ultrathin Mettalic Membranes on Ceramic Supports by Sputter Deposition", Journal of Membrane Science, 1995, pp. 89-100, 99, Elsevier Science B.V., Amsterdam, The Netherlands.

Karavanov et al. "Hydrogenation of Acetylenic and Ethylenic Alcohols in the Liquid Phase on Membrane Catalysts Consisting of Binary Alloys of Palladium With Nickel and Ruthenium", Kinet. Catal., 1984, pp. 56-60, 25, Plenum Publishing Corporation, New York, USA.

Karpova et al., "Sorption of Hydrogen by Disperse Palladium-Copper Alloys", Russ. J. Phys. Chem., 1959, pp. 1393-1400, 33-#6, Leningrad (English summary at end of article).

Keuler et al., "Characterising Palladium-Silver and Palladium-Nickel Alloy Membranes Using SEM, XRD and PIXE", Nuclear Instruments and Methods in Physics Research, 1999, pp. 378-382, B. 158, Elsevier Science B.V., Amsterdam, The Netherlands.

Kikuchi et al., "Preparation of Supported Thin Palladium-Silver Alloy Membranes and Their Characteristics for Hydrogen Separation", Gas Separation & Purification, 1991, pp. 261-266, 5, Butterworth-Heineman Ltd., USA.

Kajiwara et al., "Hydrogen Permeation Properties Through Composite Membranes of Platinum Supported on Porous Alumina", Catalysis Today, 2000, pp. 65-73, 56, Elsevier Science B.V., Amsterdam, The Netherlands.

Knapton, "Palladium Alloys for Hydrogen Diffusion Membranes", Platinum Metals Review, 1977, pp. 44-50, 21, Johnson Matthey PLC, London, UK.

Koppel et al., A Fuel Cell Primer: The Promise and the Pitfalls, Sep. 15, 2000. pp. 1-31, Rev. 4.

Lewis, The Palladium Hydrogen System, 1967, pp. 70-71, 78-79, 82-85, 116-117, and 144-145, Academic Press, London, UK.

Li et al., "Preparation of Pd/Ceramic Composite Membrane 1. Improvement of the Conventional Preparation Technique", Journal of Membrane Science, 1996, pp. 257-260, 110, Elsevier Science B.V., Amsterdam, The Netherlands.

Massalski et al., "Cu-Pd (Copper-Palladium)", Binary Alloy Phase Diagrams, 1990, pp. 947-948, vols, 1-3, ASM International, USA.

McCool et al., "Composition Control and Hydrogen Permeation Characteristics of Suptter Deposited Palladium-Silver Membranes", Journal of Membrane Science, 1999, pp. 67-76, 161, Elsevier Science B.B., The Netherlands.

Morreale et al., J. Membr. Sci., 241: 219 (2004).

Nam et al., "Hydrogen Separation by Pd Alloy Composite Membranes: Introduction of Diffusion Barrier", Journal of Membrane Science, 2001, pp. 177-185, 192, Elsevier Science B.V., Amsterdam, The Netherlands.

Nam et al., "Preparation of a Palladium Alloy Composite Membrane Supported in a Porous Stainless Steel by Vacuum Electrodeposition," Journal of Membrane Science, Jan. 10, 1999, pp. 163-173, vol. 153, Issue 2, Elsevier Science, B.V., United Kingdom.

Paglieri et al., "A New Preparation Techniques for Pd/Alumina Membranes with Enhanced High-Temperature Stability", Industrial & Engineering Chemistry Research, 1999, pp. 1925-1936, 38-#5, American Chemical Society, Washington, DC, USA.

Paglieri, "Chapter 6: Preparation of Palladiium-Copper Alloy Membranes for Hydrogen Separation" and "Chapter 7: Conclusions" and "Chapter 8: Recommendations for Future Work", Palladium and Palladium-Copper Composite Membranes for Hydrogen Separation, 1999, pp. 119-146, Colorado School of Mines, Golden, USA.

Peachey et al., "Composite Pd/Ta Metal Membranes for Hydrogen Separation", Journal of Membrane Science, 1996, pp. 123-133, 111, Elsevier Science B.V., Amsterdam, The Netherlands.

Piper, "Diffusion of Hydrogen in Copper-Palladium Alloys", Journal of Applied Physics, 1966, pp. 715-721, 37-#2, American Institute of Physics, New York, USA.

Roa et al., "The Influence of Alloy Composition on the H2 Flux of Composite Pd-Cu Membranes", Desalination, 2002, pp. 411-416, 147, Elsevier Science B.V., Amsterdam, The Netherlands.

Rodina et al., "The Interaction of Hydrogen with Certain Palladium—Gold and Palladium—Silver—Gold Alloys", Russian Journal of Physical Chemistry, 45(5), 1971.

Roy et al., "Economics and Simulation of Fluidized Bed Membrane Reforming", International Journal of Hydrogen Energy, 1998, pp. 745-752, 23-#9, Elsevier Science Ltd., Great Britain.

Saracco et al., "High-Temperature Membrane Reactors: Potential and Problems", Chemical Engineering Science, 1999, pp. 1997-2017, 54, Elsevier Science Ltd., Oxford, UK.

Shu et al., "Simultaneous Deposition of Pd and Ag on Porous Stainless Steel by Electroless Plating", Journal of Membrane Science, 1993, pp. 181-195, 77, Elsevier Science Publishers B.V., Amsterdam, The Netherlands.

Thomas et al., Fuel Cells—Green Power, 1999, pp. 1-33, Los Alamos National Laboratory, Los Alamos, USA.

Uemiya et al., "Hydrogen Permable Palladium-Silver Alloy Membrane Supported on Porous Ceramics", Journal of Membrane Science, 1991, pp. 315-325, 56, Elsevier Science Publishers B.V, Amsterdam, The Netherlands.

Uemiya et al., "Separation of Hydrogen Through Palladium Thin Film Supported on a Porous Glass Tub", Journal of Membrane Science, 1991, pp. 303-313, 56, Elsevier Science Publishers B.V., Amsterdam, The Netherlands.

Uemiya, "State-of-the-Art of Supported Metal Membranes for Gas Separation", Separation and Purification Methods, 1999, pp. 51-85, 28-#1, Marcel Dekker, Inc., New York, USA.

Van Swaay et al., "Permeability and Diffusion on Hydrogen Through Palladium", Transactions of the Metallurgical Society of AIME, Apr. 1960, pp. 285-289, 218, The Metallurgical Society of AIME, USA.

Wu et al., "Preparation of a Palladium Composite Membrane by an Inproved Electroless Plating Technique", Industrial & Engineering Chemistry Research, 2000, pp. 342-348, 39, American Chemical Society, Washington, DC, USA.

Xomeritakis et al., "Fabrication of Thin Metallic Membranes by MOCVD and Sputtering", Journal of Membrane Science, 1997, pp. 217-230, 133, Elsevier Science B.V., Amsterdam, The Netherlands.

Yeung et al., "Novel Preparation of Pd/Vycor Composite Membranes", Catalysis Today, 1995, pp. 231-236, 25, Elsevier Science B.V., Amsterdam, The Netherlands.

Yeung et al., "Novel Preparation Techniques for Thin Metal-Ceramic Composite membranes", AIChE Journal, Sep. 1995, pp. 2131-2139, 41-#9, American Institute of Chemical Engineers, New York, USA.

Zetkin et al., "Diffusion and Penetrability of Deuterium in the Alloy Pd-53 at % Cu", Sov. Phys. Solid State, 1992, pp. 83-85, 34-#1, American Institute of Physics, New York, USA.

Zetkin et al., "Influence of Structural Transformations on the Diffusion Parameters of Deuterium in Palladium-Copper Alloys", Phys. Met. Metall., 1987, pp. 130-134, 64-#5, Pergamon Press PLC, Poland.

Zhao et al. "Preparation and characterization of palladium-based composite membranes by electroless plating and magnetron sputtering", Catalysis Today 56 (2000), p. 89-96.

Supplementary European Search Report for European Patent Application No. 03718215, completed Jan. 11, 2006 (4843-37-PEP).

Rodman et al. "Studies of the oxidation of palladium complexes by the advanced oxidation process pretreatment of model catalysts for precious metal analysis," Talanta, Sep. 15, 2006, vol. 70, No. 2, pp. 426-431.

Zhao et al. "Preparation of palladium composite membranes by modified electroless plating procedure," Journal of Membrane Science, May 13, 1998, vol. 142, No. 2, pp. 147-157.

* cited by examiner

METHOD OF MAKING SULFUR-RESISTANT COMPOSITE METAL MEMBRANES

CROSS REFERENCE TO RELATED APPLICATIONS

This application is a continuation-in-part of U.S. patent application Ser. No. 11/381,488, filed May 3, 2006, which is a divisional application of U.S. patent application Ser. No. 10/249,387, filed Apr. 3, 2003, now abandoned, which claims the benefit of priority under 35 U.S.C. §119(e) to U.S. Provisional Patent Application No. 60/369,674, filed Apr. 3, 2002. This application also claims the benefit of priority under 35 U.S.C. §119(e) to U.S. Provisional Patent Application No. 60/805,723 filed Jun. 23, 2006. Each of these related applications are incorporated herein by reference.

GOVERNMENT INTEREST

This invention was made with Government support under grant number DE-FG26-03NT41792 awarded by the U.S. Department of Energy (from the University Coal Research Program, grant number DE-FG03-93ER14363 awarded by the U.S. Department of Energy Office of Science and grant number W56HZV-06-C-0077 awarded by the U.S. Department of Defense. The Government has certain rights in this invention.

FIELD OF THE INVENTION

The invention relates to thin, hydrogen-permeable, sulfur-resistant membranes formed from palladium or palladium-alloy coatings on porous, ceramic or metal supports, methods of making these membranes, and devices that incorporate these membranes.

BACKGROUND OF THE INVENTION

Inexpensive sources of purified hydrogen are sought after for many industrial chemical production processes and in the production of energy in fuel cell power systems. Similarly, inexpensive methods of purifying hydrogen could significantly expand the applicability of hydrocarbon reforming, reforming reactors and the water gas shift reaction.

Palladium and its alloys, as well as nickel, platinum and the metals in Groups III-V of the Periodic Table are all permeable to hydrogen. Hydrogen-permeable metal membranes made of palladium and its alloys are the most widely studied due to their high hydrogen permeability, their chemical compatibility with many hydrocarbon containing gas streams, and their theoretically infinite hydrogen selectivity. Hydrogen molecules ($H_2$) present in a steam of mixed gas molecules will dissociate into hydrogen atoms, which dissolve into the palladium and diffuse across a palladium metal barrier to recombine into hydrogen molecules and dissociate from the opposite surface of the palladium barrier as a purified hydrogen gas. Thus, a gas stream formed in different industrial processes that contains many different molecular components including hydrogen can be directed to a palladium membrane to selectively recover the hydrogen present in the gas, thereby producing a purified hydrogen gas stream without significant additional energy input.

Unfortunately, pure palladium membranes are themselves expensive when used in such purification processes due to their rapid degeneration and limited life. Atomic hydrogen is so soluble in palladium that it forms a separate hydride phase ($\beta$), which has a much larger lattice constant, causing swelling, warping and cracking of the palladium membrane. This $\alpha \leftarrow\!\!\rightarrow \beta$ phase transition takes place at the critical temperature of 295° C., making it difficult to avoid premature breakdown during prolonged industrial use. Additionally, sources of sulfur, present in many industrial process gasses, produce hydrogen sulfide when they contact palladium membranes at high temperature. Hydrogen sulfide is a potent poison of the hydrogen dissociation catalysts including palladium metal membranes, and exposure to sulfur-bearing gasses rapidly lowers the permeability of a palladium membrane to hydrogen requiring the replacement of the relatively expensive membrane structure.

In an attempt to overcome these problems with pure palladium membranes, alloys of palladium have been tested that display a comparable hydrogen permeability with superior physical strength and greater resistance to thermal degradation and sulfur poisoning. As early as 1963, McKinley (U.S. Pat. No. 3,350,845) formulated alloys of palladium with copper, silver and gold and showed that palladium-gold alloys containing about 55 weight percent gold had improved resistance to poisoning by sulfur-containing gases, albeit with about a 10-fold decrease in hydrogen permeability. Alternatively, palladium-silver membranes and palladium-copper membranes containing about 10 weight percent silver and about 40 weight percent copper, respectively, showed an increased permeability to hydrogen but were equally or more sensitive to sulfur poisoning compared to pure palladium membranes.

The palladium-gold membranes disclosed by Mckinley were relatively thick and prepared by conventional metallurgy techniques. Such membranes are still prohibitively expensive for most industrial applications. Therefore, there has been a long-felt need for a fabrication method capable of inexpensively and efficiently producing palladium alloy membranes having high thermal stability, durability and resistance to sulfide poisoning.

Recent research efforts have focused on the development of composite metal membranes consisting of a relatively thin Pd or Pd-alloy coatings on hydrogen permeable base metals, or on porous ceramic or stainless steel supports.

Many palladium alloys such as $Pd_{73}Ag_{27}$, $Pd_{95}Au_5$, and $Pd_{60}CU_{40}$ possess higher hydrogen permeability than pure palladium. In the 1960s, McKinley and coworkers (U.S. Pat. No. 3,439,474 (1969)) reported that binary alloys of Pd with Au and Cu had pure hydrogen permeabilities greater than Pd and PdAg, were unaffected by thermal cycling, and had some resistance to sulfur poisoning by hydrogen sulfide. The inhibition or reduction of the pure hydrogen flux due to exposure to 4 ppm hydrogen sulfide through the 40 mass percent Au alloy was the least compared to pure Pd, PdAg and PdCu alloys.

The sulfur resistance of PdCu foil membranes was investigated by researchers at the DOE NETL laboratory (B. D. Morreale, B. D, et al., *J. Membr. Sci.*, 241:219 (2004)). They reported the best sulfur resistance with a 20% Cu in Pd binary alloy having an FCC crystal structure. But this $Pd_{80}Cu_{20}$ alloy has only 20% of the hydrogen permeability of pure Pd and about 2 times less than 40% Au.

Thus, there is still a need for sulfur resistant, composite metal membranes and improved methods of designing and making these membranes.

SUMMARY OF THE INVENTION

The present invention provides methods of fabricating a sulfur-resistant composite metal membranes including seeding a substrate with palladium crystallites, decomposing any organic ligands present on the substrate, reducing the palladium crystallites on the substrate to the metallic form, depositing a film of palladium metal on the substrate and then depositing a second, gold film on the palladium film. These two metal films are then annealed at a temperature between about 200° C. and about 1200° C. to form a sulfur-resistant, composite PdAu alloy membrane. PdAu alloy layers formed by this method preferably have a thickness between about 2 μm and about 10 μm and the substrate is preferably a stainless steel support having a porous $ZrO_2$ coating that may optionally be sealed so as to render one or more portions of the substrate impermeable to hydrogen gas.

The substrate may be seeded by airbrushing a palladium salt solution onto the surface of the substrate. Preferably, a palladium salt solution containing palladium (II) acetate and chloroform is used for this technique.

The substrate may be fired to eliminate any organic ligands present. The substrate may also be reduced by immersion in a reducing solution such as a solution containing water, $NH_3OH$ and hydrazine.

The first film of palladium metal is deposited on the substrate by electroless plating. In a preferred embodiment, a palladium plating bath solution is pumped over the surface of the substrate, preferably until a palladium layer having a thickness of between about 1 μm and about 7 μm is formed. The palladium plating bath may be a solution containing water, $NH_3OH$, HCl, Palladium (II) chloride and hyradzine. Similarly, the deposition of a second film of gold is preferably performed by pumping a gold plating bath, such as a solution containing water, NaOH and gold (III) chloride, over the surface of the substrate, and this is continued until a gold layer having a thickness of between about 1 μm and about 7 μm is formed on the palladium layer.

Further metal layers of palladium, gold or other metals, such as silver, may be formed on the second, gold layer. Alternatively, palladium and silver layers may be co-deposited on the substrate, followed by a layer of gold. Alternatively, palladium silver and gold layers may be sequentially deposited on the substrate by sequential electroless plating.

The invention also provides a sulfur-resistant PdAu composite membranes made by seeding a substrate with palladium crystallites, optionally decomposing any organic ligands present on the substrate, reducing the palladium crystallites to the metallic form, depositing a first film of palladium metal on the substrate, depositing a second film of gold on the palladium film and, annealing the metal films to form a composite PdAu alloy membrane.

In the deposition of the metal membranes on the substrate during the fabrication methods of the present invention, the depositing steps are preferably conducted in the absence of both organic complexing agents, such as EDTA, and tin.

The invention also provides hydrogen-permeable and sulfur poisoning-resistant composite membranes. These composite membranes are composed of a porous substrate having a PdAu alloy layer on at least one surface. The PdAu alloy preferably has a mass percent Au between 5 and 50 mass percent and wherein the PdAu alloy is non-homogeneous.

DETAILED DESCRIPTION OF THE INVENTION

Figure 1:
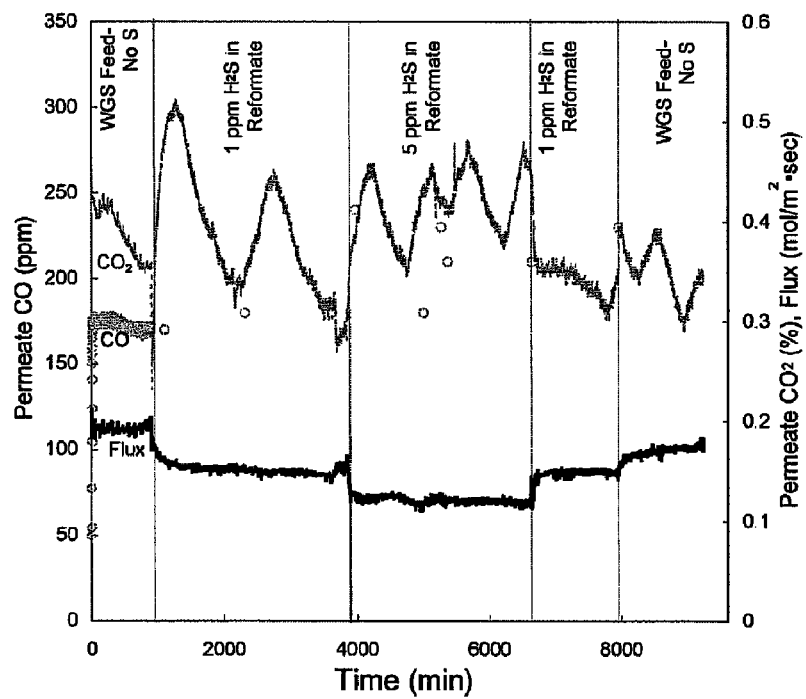
FIG. 1 is a graphical representation of the effect of gas mixtures on the flux as well as CO and $CO_2$ composition in the permeate for a tested PdAu composite membrane (GTC-75). $H_2S$ was added to the baseline water gas shift mixture at 1 ppmv and 5 ppmv. T=400° C. and total feed pressure was 60 psig.

The present invention provides metal alloy membranes having high hydrogen permeability and good resistance to sulphide poisoning. The invention also provides optimal methods to fabricate sulfur resistant, high flux composite membranes that can be applied to high temperature hydrogen separations.

One embodiment of the invention provides composite membranes composed of a palladium alloy film supported on a substrate that display higher $H_2$ flux from a multicomponent gas mixture containing hydrogen sulfide and other sulphurous constituents than the $H_2$ flux for previously reported palladium alloy composite membranes. These membranes are formed on porous supports by electroless plating methods.

The composite membranes include a thin palladium alloy layer on a porous substrate. The porous substrate may be any porous, inorganic support including oxide ceramics (e.g., alumina, titania and zirconia), non-oxide ceramics (e.g., SiC and SiN), sintered or porous metals (e.g., stainless steel and nickel), sintered or porous metals with ceramic surfaces, and porous vycor glass. The substrate may be either tubular or planar or any geometry such that the surfaces that bear the Pd alloy film are adequately exposed.

A permeable diffusion barrier separating the substrate from the Pd alloy film is desirable. For example, a stainless steel support coated with porous $ZrO_2$ having a pore diameter of about 80 nm has been extensively tested and shown to work well.

Substrates that are symmetric or asymmetric, have pores of different sizes, or have a gradient of pore sizes, may be used. While symmetric substrates are typically less expensive, asymmetric substrates have a lower resistance to flow and therefore minimize the pressure drop experienced in the support. Thus, given a similar thickness of Pd alloy deposited on the substrate, greater fluxes can be achieved with an asymmetric support. A small pore size in the substrate is needed to minimize surface roughness and therefore the corresponding Pd film thickness. Alternatively, at pore sizes of 5 nm in diameter or less, the adhesion of the film to the substrate is reduced. Good results have been obtained with asymmetric substrates with a pore size gradient that extends over a 20-80 nm diameter pore size range.

Certain surfaces of the substrate may be sealed as desired to prevent $H_2$ from flowing through those regions of the membrane. Typically, a low temperature glaze (e.g., potter's glaze) is utilized as the sealant because many substrates are subject to damage if exposed to high temperatures.

The hydrogen flux through these Pd alloy membranes is inversely proportional to the thickness of the membrane and therefore, thinner Pd alloy membranes are more desirable for their increased rate of hydrogen flux and lower cost for the palladium and alloy metal components. When a support with small pores is used, a thinner film may be used and still produce a leak-free membrane, because it is easier to cap small pores by plugging them with metal. Very thin, defect-free Pd alloy membranes however, are difficult to form and the inherent defects lead to losses in selective permeability of the membrane to hydrogen and more rapid physical deterioration of the membrane, requiring more frequent membrane replacement. Thin metal films are sufficient to prevent leaking at low temperatures, but when heated, the metal crystallites may rearrange, opening slightly covered pores in the ceramic support, leading to the formation of pores or outright rupture of the palladium alloy membrane and loss of selective hydrogen permeability. Pd alloy membranes having a thickness in the range of between about 1 nm and about 10 nm are preferred as striking a balance between good hydrogen diffusion rates, relatively easy defect-free production and physical durability. Pd alloy membranes having a thickness in the range of between about 2 nm and about 5 nm are the most preferred.

The weight percent content of the palladium alloy is formulated to maximize hydrogen permeability while achieving resistance to sulfur poisoning and physical durability. With PdCu alloys, the hydrogen permeability increases through a maximum around 40 wt. % Cu ($PdCu_{40}$). This high percentage of Cu significantly reduces membrane cost relative to pure Pd, and the $PdCu_{40}$ alloy exhibits increased resistance to hydrogen sulfide poisoning. Further, a $PdCu_{40}$ membrane can withstand repeated temperature cycling with less distortion than pure Pd because at 40 wt. % Cu, the critical temperature for β-hydride phase formation is below room temperature. Similarly, $PdAg_{23}$ has a higher hydrogen permeability than pure palladium membranes and an improved resistance to sulfide poisoning. Surprisingly, and in contrast to the PdAu membranes disclosed by Mckinley (U.S. Pat. No. 3,350,845), PdAu membranes having a lower weight percent Au in the range of $Pd_{95}Au_5$ to $Pd_{55}Au_{45}$ have a higher hydrogen flux than pure palladium and a much greater resistance to sulfide poisoning than comparable PdCu or PdAg membranes. For example, a 5 micrometer $Pd_{85}Au_{15}$ membrane shows only a 38% drop in hydrogen flux in the presence of 5 ppm $H_2S$ compared to a 71% drop for a comparable $Pd_{94}Cu_6$ and the $Pd_{85}Au_{15}$ membrane had a higher hydrogen flux in the presence of $H_2S$ than the $Pd_{94}Cu_6$ membrane in the absence of $H_2S$. A $Pd_{80}Au_{20}$ membrane having a thickness of about 2.5 micrometers and formed on a stainless steel substrate with a $ZrO_2$ coating has a hydrogen permeability approaching that of pure palladium and a hydrogen/nitrogen separation factor of greater than the ideal value of 400 when tested at 400° C. Similarly, a $Pd_{95}Au_5$ membrane having a thickness of about 3 micrometers and formed on a stainless steel substrate with a $ZrO_2$ coating had a hydrogen permeability approaching that of pure palladium and a hydrogen/nitrogen separation factor of greater than 10,000 when tested at 400° C. A $Pd_{90}Au_{10}$ membrane formed on a stainless steel substrate with a $ZrO_2$ coating exposed to a water gas shift gas mixture (51% $H_2$, 26% $CO_2$, 21% $H_2O$, 2% CO) at 400° C. operated at a 76% $H_2$ recovery which is nearly the same as the hydrogen flux seen with exposure to a pure gas flux having a similar $H_2$ partial pressure, indicating a hydrogen selectivity with only minor reductions in the presence of a mixed molecular gas feed stream.

This hydrogen selectivity and substantial resistance to sulfide poisoning is believed to result from the fabrication methods of the present invention that produce a PdAu alloy which is not perfectly homogenous on the surface of the substrate. The fabrication methods described below produce a partial PdAu alloy in which Au selectively segregates to the surface of the PdAu film, effectively forming pools of Au on the free surface of the PdAu film. For instance, the present inventors used Auger electron spectroscopy to show that a $Pd_{70}Au_{30}$ alloy at 250° C. actually contained 75 at % Au on its (111) surfaces and 80 at % Au on its (110) surfaces. Equivalent-Medium Approximation (EMA) was used to accomplish this for a class of Pd—X alloys and the model predictions were found to compare favorably with ion scattering experiments. The segregation of Au to the Pd (111) surface is stronger than that of Cu to the same surface. For instance, a 20 at % Au concentration in the bulk is predicted to give 58 at % Au on the surface, whereas a 20 at % Cu concentration in the bulk is predicted to give 20 at % Cu on the surface as well-i.e. there is no surface segregation of Cu at these concentrations.

Both Pd and Au form FCC structures throughout the temperature range of −73° C. to 900° C. Mixtures of Au and Pd are still FCC but show a tendency to form ordered arrangements of atoms as the temperature is lowered. Within a single FCC crystal containing both Au and Pd, the order can be long range (LRO) or short range (SRO). The LRO is found near Au3Pd, AuPd, and AuPd3 stoichiometries. As the stoichiometry moves from one of these three regions, the LRO starts to deteriorate. At stoichiometries far from these points, the structure is FCC with a completely random arrangement of Pd and Au atoms. At intermediate stoichiometries, though, there is some "clumping" of the Au and Pd atoms, and this is the SRO order mentioned above. Both experimental and ab initio investigations by the present inventors have shown that such SRO exists at stoichiometries and temperatures of interest in the commercial operation of the composite metal membranes of the present invention. These data indicate that 20% Au within the bulk results in 80% Au on (111) surfaces. These experimental and computational results indicate that monolayers with roughly this fraction of Au atoms will form SRO structures that are desirable from a functionality standpoint.

Without intending to be bound by any one theory, the present inventors believe that this partial segregation phenomenon accounts for the reduced hydrogen permeability of the PdAu composite membranes tested and also to the substantially enhanced resistance to sulfide poisoning seen with the PdAu membranes of the present invention. Sulfide poisoning of membrane surfaces has been found to correlate with the binding energy of sulfur atoms to the atoms at the surface of the metal membranes. Studies by the present inventors have revealed substantial overlap of sulfur p-states with the palladium surface d-band giving rise to a strong covalent bond between the adsorbate and the surface. This is presumably why the sulfur is so pernicious; the sulfur is a very strong site blocker. Comparing the binding energy between the sulfur atoms and the surface atoms of Pd, Cu, Au, Pd—Cu alloy and Pd—Au alloy membranes, Pd—Au alloys have the lowest binding energy while Pd metal membranes have the highest binding energy (ordered from of Pd>Cu>Pd—Cu alloys>Au>Pd—Au alloys). Density Functional Theory (DFT) simulation determined that sulfur atoms settled in the FCC sites, as expected. The bond length between a sulfur atom and its nearest Pd neighbor was determined to be of 2.442 Å. Other studies have found a lower value for 25% coverage of sulfur: 2.27 Å (DFT) and 2.23-2.38 Å (experimental). This trend makes sense since the higher coverage causes sulfur atoms to repel each other, reducing the binding energy and extending the bond length. The test was repeated for sulfur binding to a pure Cu sample to show a binding energy of 4.49 eV/atom. The DFT binding energy analysis was then performed again with 100% Au coverage on the Pd (111) surface. While this would never be used as a hydrogen separation membrane, the analysis was intended to serve as a basis for assessing how low the binding energy of sulfur could go in this Pd—Au system. The associated binding energy was determined to be only 2.085 eV—less than half of that associated with the Pd—S surface. This indicates the potential of the Pd—Au alloy to resist sulfide poisoning. The (111) surface was then modified to have a 50% Au coverage. As expected, the relaxed system is characterized by Au—S bond lengths (2.884 Å) that are greater than their Pd—S counterparts (2.437 Å). Significantly though, the average binding energy of sulfur to this alloyed surface is 2.573 eV—much closer to that of the pure Au surface than that of the pure Pd. In other words, the clusters of Au on the Pd surface have caused a reduction in the sulfur binding energy that is not in proportion to the amount of Au present. This result may be related to the promotional effect of Au in forming vinyl acetate (VA) in Pd—Au alloys.

Au nanoclusters exhibit strong catalytic behavior for a CO oxidation, and vinyl acetate synthesis, and this has prompted a flurry of research activity. This is germane to the Pd—Au membranes since ordered Au atoms on the Pd surface may be thought of as nanoclusters of Au. Particularly relevant to the function of the membrane, though, is role of Au in influencing the rate of $H_2$ adsorption. Au clusters on Pd, Pd clusters on Au, and Pd overlayers on Au substrates also have potential applications for systems in exhaust cleanup and fuel cells. These efforts form a basis for a consideration of how hydrogen adsorption is influenced by the presence of Au in PdAu membranes. The difference is that Au clusters in the membranes are short-ranged ordered atoms within the Pd lattice with either smooth or restructured single-crystal surfaces. The studies by the present inventors indicate that the presence of 10-20 weight percent Au actually increases the permeability of hydrogen, and this may be due to the nano-catalytic properties of Au on the membrane surface.

Nudged elastic band (NEB) transition state theory was implemented within the DFT analysis to estimate the reaction barrier and adsorption energy of $H_2$ on Pd—Au surfaces. Only two (111) layers were considered, and the bottom layer was held fixed during H adsorption. It was first verified that adsorption to neighboring FCC sites for a pure Au membrane is endothermic (11.67 kcal/mol) while the same process on pure Pd membrane has a negative adsorption energy (21.92 kcal/mol). Significantly though, a 50% coverage of Au was found to be exothermically adsorbed $H_2$ (-11.27 kcal/mol). This is consistent with experimental data, which indicates that H permeability is reduced, but not destroyed, by the presence of high Au surface coverage. Roughening of the surface so as to allow out-of-plane clusters of Au atoms will only increase the catalytic effect of the Au.

Molecular dynamics (MD) simulation tools were employed to study the diffusion of H atoms through Pd—Au membranes in order to better understand the role of the Au atoms. Within the MD paradigm, atoms are viewed as point masses with forces stipulated among atoms of different species. These forces can include bond order terms and, in that case, can even allow for chemical reactions. MD was employed to study a single H atom moving through a block of six unit cells of Au, Pd, and AuPd3 crystals. The simulation times tend to be extremely short-on the order of 1 nanosecond—and so the lattices were dilated in order to increase the diffusivity. Qualitative conclusions could then be made about how the diffusivity of H is influenced by stoichiometry. It was found that H tends to get trapped in small clusters of Au atoms and that this reduces the overall diffusivity of the metal. This conclusion is consistent with experimental evidence. Typically, a single hydrogen atom is allowed to diffuse through a Pd—Au crystal. It was observed that the H atom spent nearly all of its time in orbital trajectories between pairs of Au atoms. Long orbital periods were followed by a rapid excursion to a new, equivalent orbital site.

The coverage dependent desorption of H from the downstream side of Pd—Au membranes was studied using the same approach as for adsorption. In this case, it is the energy barrier that is of interest. For example, the associated desorption of H was studied using a two-layer structure of Pd(111) with a surface composition of $Pd_{0.5}Au_{0.5}$. Two cases were considered: 50% and 100% initial coverage of H on the preferred FFC sites. The study indicates that both the desorption and adsorption barriers increase significantly with coverage, with the net effect being a slower rate of H desorption at high coverages.

Thus, one embodiment of the invention provides a method of making these composite Pd—Au alloy membranes. Both planar and tubular Pd/Au membranes can be fabricated using the improved, sequential, electroless plating processes described here. In a preferred embodiment, tubular Pd/Au membranes are formed on stainless steel supports. PdAu alloy membranes are deposited onto $ZrO_2$/stainless steel substrates by a sequential electroless plating process. Although other deposition methods may be used, electroless plating offers advantages over other deposition techniques because it can deposit uniform films on complex shapes and large substrate areas with sufficient hardness, using simple equipment. PdAu alloy membranes are fabricated by sequential plating of first Pd and then Au. The target thickness for the PdAu alloy films is between 2 µm and 5 µm to maximize the hydrogen permeance.

This method advantageously eliminates tin (Sn) and carbon impurities in the Pd films, which can cause structural instability, particularly at high temperature, and reduced $H_2/N_2$ separation ratio (pure gas permeability ratio). These methods are particularly suited for alloy compositions with 5-50 mass % Au, which the present inventors have shown to have the highest permeability and best resistance to sulfur. Importantly, no organic complexing agent, such as EDTA, is used in the Pd plating solution to minimize contamination by carbon. When pure gases are used, they are preferably nominally 99.999% pure (UHP grade). The process includes sequentially depositing Pd and then the alloying metal, Au or Cu, using electroless plating, followed by a high temperature anneal to allow intermetallic diffusion of Pd and the alloying metal.

Initially, a substrate is provided. If needed, the provided substrate is subjected to a pre-processing step in which the substrate is subjected to one or more operations that are needed to place the substrate in condition for plating related operations and/or one or more operations that are more readily accomplished prior to plating related operations. If the substrate that is provided is not clean or becomes dirty before a plating operation, the substrate must be cleaned to remove any salts or other materials that could interfere with the subsequent plating processes. Typically, cleaning is carried out with isopropanol and deionized water but other cleaning procedures that remove the undesirable material or materials are also feasible. Further, if the substrate that is provided does not have the appropriate dimensions, appropriate sizing operations are undertaken. Typically, this involves cutting the substrate but other form- or shape-altering methods are also feasible. It is also feasible to perform sizing operations at different points in the composite membrane production process.

In these substrate preparation processes, the surfaces of the substrate are sealed in places where it is undesirable to have $H_2$ flow in the finished membrane. Typically, a low temperature glaze (e.g., potter's glaze) is utilized because many substrates are subject to damage if exposed to high temperatures. For example, if the U.S. Filter T1-70 5 nm filter, an asymmetric ceramic filter, is exposed to temperatures above 600° C., the thin top layer of the filter is subject to damage. Regardless of the sealant utilized, the sealant is either painted onto the surface to be sealed or the surface is dipped in sealant. Other methods, such as spraying, are also feasible. In a preferred embodiment, the ends of a tubular substrate are each dipped into the sealant. With the ends sealed and assuming that the Pd alloy film is going to be applied to the outer wall of the substrate, $H_2$ and other materials that are in a stream that is passing through the tubular substrate are constrained to traveling through the inner wall of the substrate to the outer wall of the substrate, and then through the Pd alloy film on the outer wall of the substrate to the appropriate collection on the outside of the tubular composite membrane. Because of the sealant, the H2 and other materials are prevented from exiting the substrate via the end walls. It is also feasible to perform sealing operations at a different point in the production process. For instance, in the case of a metal substrate, sealing by brazing, silver soldering or welding are feasible at any point in the production process.

After pre-processing of the substrate, the surface of the substrate where the Pd alloy film is to be deposited is "seeded" with Pd crystallites to catalyze the rate of film growth (i.e. heterogeneous nucleation as opposed to homogenous nucleation) on the substrate and achieve good adhesion of the palladium "seeds" to the substrate by employing palladium seeds that are smaller than the grains on the surface of the substrate that is being plated. This process can be performed using a variety of methods including impregnation with an organic solution of Pd acetate. In a preferred embodiment, the membrane supports are seeded with palladium nanocrystallites by airbrushing a solution of palladium salt onto the surface of the chosen support. In the case of a metal substrate, the seeding of the surface with Pd crystallites may be accomplished using an organic Pd solution in which the solvent is a light, polar, organic solvent, such as tetrahydrofuran (THF), ethyl acetate, acetonitrile, diethyl ether, methyl ethyl keton (MEK), or acetone. Preferably, the solvent is chloroform. The composition of a preferred solution or "activation bath" for seeding substrates with palladium nanocrystals is shown in Table 1.

TABLE 1

| Component | Quantity |
|---|---|
| Palladium (II) Acetate, 99% pure | 3.3 grams |
| Chloroform, HPLC grade | 100 mL |

The membrane is then fired in air in order to decompose any organic ligand present. Air firing at about 350° C. for about 5 hours is typically sufficient to eliminate the acetate ligand present in the activation bath of Table 1, but one of skill in the art will readily recognize that variations on this time and temperature can be made while still accomplishing the decomposition of organic ligands. The activation process may be performed more than once and is preferably performed twice.

Prior to any plating process, the activated membrane is reduced in order to convert the palladium crystallites to the metallic form. This may be accomplished by immersion in a dilute hydrazine solution for 20 minutes at 50° C., but it will be readily recognized that variations on this reduction process are possible while still accomplishing the reduction of the crystallites to the metal form. A preferred hydrazine solution used in reducing the palladium crystallites is provided in Table 2.

TABLE 2

| Component | Quantity |
|---|---|
| Deionized $H_2O$ | 650 mL/L |
| 28-30 wt % $NH_3OH$ | 340 mL/L |
| Hydrazine (3M) | 10 mL/L |

After the portion of the surface that is to bear the Pd alloy film has been seeded, a Pd film is deposited on the seeded surface. Electroless plating systems, such as non-flowing plating, batch plating and vacuum pump plating, may be used to deposit the Pd film. In one embodiment, the Pd film is deposited using a flow system with an osmotic pressure gradient. In another embodiment, a plating bath is prepared containing palladium chloride and the bath is pumped over the surface of the activated and reduced membrane. A preferred palladium plating bath composition is provided in Table 3.

TABLE 3

| Component | Quantity |
|---|---|
| Deionized $H_2O$ | 602 mL/L |
| 28-30 wt % $NH_3OH$ | 392 mL/L |
| 37 wt % HCl | 6 mL/L |
| Palladium (II) Chloride, 99% pure | 5.5 g/L |

3 M hydrazine is added to the plating bath shown in Table 3 immediately prior to plating, with a volume ratio of 100 parts plating bath to 1 part hydrazine. The ratio of the volume of Pd plating solution to the area to be plated ranges from about 3 $cm^3/cm^2$ to about 5 $cm^3/cm^2$. The bath is then heated to about 50° C. and pumped over the surface of the activated and reduced membrane. The plating cycle continues for a time sufficient to produce the desired thickness of the palladium film. The deposited film is typically in the range of about 1 μm to about 7 μm thick. A typical plating cycle lasts about 20 minutes to produce a Pd layer having a thickness of about 1 μm.

A metal to be alloyed with the palladium layer is then plated on the palladium-plated substrate. This metal(s) may also be applied by electroless plating. The electroless plating may be conducted in the same manner as the plating of the palladium plating operation. In the case of gold plating, a preferred gold plating bath is provided in Table 4.

TABLE 4

| Component | Quantity |
|---|---|
| Gold (III) Chloride, 99% pure | 1 g/L |
| 50 wt % Sodium Hydroxide | 20 mL/L |
| Deionized $H_2O$ | 980 mL/L |

In one embodiment, gold plating is performed by flowing the gold plating bath on the film (activated) side of the membrane, while the reducing bath from Table 2 is simultaneously flowed on the support side of the membrane. This is done at 50° C. and plating continues until a uniform film of gold of a desired thickness is formed on the palladium membrane surface.

If another alloy metal is to be added over the first alloy metal layer, it is added following the application of the first alloying metal. For example, if silver plating is to be conducted in place of the gold layer described above (i.e. if a silver layer is to be applied to the palladium layer) or if a silver layer is to be placed over the gold layer described above (i.e.

if a silver layer is to be applied to the gold layer that has been established on the palladium layer, with the intent of eventually forming a ternary Pd—Au—Ag alloy membrane), that silver layer is also added using any of the electroless plating methods noted above. A preferred silver plating bath is described in Table 5.

TABLE 5

| Component | Quantity |
| --- | --- |
| Silver Nitrate, 99.9% pure | 0.31 g/L |
| 28-30 wt % $NH_3OH$ | 780 mL/L |
| Deionized $H_2O$ | 220 mL/L |

In one embodiment, the silver plating bath of Table 5 is used and 0.3 M hydrazine is added to the plating bath immediately prior to plating, in a volume ratio of 50 parts plating bath to 1 part hydrazine. The bath is then heated to 40° C. and flowed over the surface of the activated and reduced membrane. This plating cycle is conducted for a time sufficient to produce a sufficiently-thick silver layer and typically lasts about 30 minutes.

In one alternative embodiment, a Pd-Ag alloy membrane may also be produced in one step using the palladium-silver plating bath provided in Table 6.

TABLE 6

| Component | Quantity |
| --- | --- |
| Silver Nitrate, 99.9% pure | 0.26 g/L |
| Tetraaminepalladium chloride, 99.9% pure | 1.37 g/L |
| 28-30 wt % $NH_3OH$ | 372 mL/L |
| Deionized $H_2O$ | 628 mL/L |
| Hydrazine (3M) | 3.33 mL/L |

In this embodiment an appropriately activated substrate is used and the plating temperature is typically about 40° C.

One way to achieve Pd and other metal layers of approximately equal thickness is by performing the metal plating operations under substantially the same thermodynamic conditions and for appropriate periods of time. It is also possible to perform the plating operations under different thermodynamic conditions and/or over different periods of time and achieve layers of substantially equal thickness. As noted above, the maximum hydrogen flux for Pd alloys is achieved with different weight percentages of different metal constituents. Consequently, the conditions under which weight percentages are achieved that are at, or near, the weight percentages for maximum hydrogen flux are typically different than those for the PdAu alloy.

After the Pd and other metal layers have been plated onto the substrate, the structure is subjected to an annealing operation sufficient to achieve at least some intermetallic diffusion of the metal(s) layer into the Pd layer. In one embodiment with a gold and palladium layer, annealing is accomplished by slowly heating the structure to a temperature between about 350° C. and about 600° C., depending upon the thickness of the gold and palladium layers, in a hydrogen atmosphere. The annealing step permits intermetallic diffusion of the Au layer into the Pd layer forming the alloy. Annealing progress may be observed by measurement of the H2 flux. When the flux reaches a steady-state value, the annealing process is complete. For thin, 1 μm films, this process will require about 24 hours at the lowest temperature. At this point, the PdAu or PdAuAg composite membranes are complete and may be used in hydrogen separation applications that involve streams of hydrocarbons that include sulfur or sulfur compounds.

An optional further step may increase the hydrogen flux of the membrane. Namely, the composite membrane may be subjected to air oxidation and reduction to activate the metal surface. This step is believed to roughen the surface of the film, thereby increasing the surface area of the film. The increased surface area is believed to provide a greater hydrogen flux. The increased surface is believed to be responsible for the greater hydrogen flux. In one embodiment, a short duration (5 to 30 minutes) air oxidation at temperatures above 350° C. followed by exposure to $H_2$ and subsequent reduction. Rather than air reduction and oxidation, the composite membrane can be subjected to $O_2$, $O_3$, acids, steam, $SO_2$, or a combination of $H_2S$/steam to disturb the surface of the palladium alloy film.

Additional objects, advantages, and novel features of this invention will become apparent to those skilled in the art upon examination of the following examples thereof, which are not intended to be limiting.

EXAMPLES

In this investigation, the $H_2$ flux from a water gas shift (WGS) mixture containing $H_2S$ was evaluated for PdAu alloys and compared with FCC PdCu alloy composite membranes previously described in the literature (F. Roa, J. D. Way, S. DeVoss, G. Alptekin. Proceedings of ICIM 8, Cincinnati, Ohio, 2004).

Example 1

Membrane Fabrication

Composite Pd—Au alloy membranes were fabricated by sequential deposition from palladium and gold electroless plating baths onto symmetric 0.2 μm cut-off α-alumina tubes (GTC-200) fabricated by Golden Technologies Company. No EDTA was used in the Pd plating solution to minimize contamination by carbon. When pure gases were used they were nominally 99.999% pure (UHP grade).

Prior to palladium plating, the surface of the membrane support was first seeded with Pd particles by impregnating the ceramic support with an organic Pd salt solution, followed by reduction in aqueous hydrazine solution. Pd and Au electroless plating baths were then used in sequence to deposit films ranging from 5 to 7 microns in thickness.

Example 2

High Temperature Permeation Tests

The membrane to be tested was loaded into a stainless steel module, which in turn was mounted in a tube furnace. To avoid embrittlement, the membranes were heated under helium and no $H_2$ was introduced until the membrane reached 350° C. Annealing the two metals was achieved during the initial single gas permeability tests. Transmembrane pressure differentials varied from a few bars to as high as 7.7 bars (100 psig), while typical operating temperatures varied from 350° C. to 450° C. Permeate pressure was local atmospheric pressure in Golden, Colo. (~0.8 bar absolute or bara=12 psia).

Example 3

Membrane Characterization

Scanning electron microscopy (SEM) was utilized to determine film thickness and surface structure; X-ray diffraction (XRD) and energy dispersive X-ray spectroscopy (EDAX) were used to study crystal structure and determine Pd—Au alloy composition.

Given the data reported by McKinley (U.S. Pat. No. 3,350,845) that PdAu alloys were superior to PdCu in terms of resistance to poisoning by $H_2S$, several PdAu alloy membranes on porous ceramic supports were made by electroless plating methods. An example is membrane GTC-31 which has an alloy composition of approximately 19 mass % Au in Pd as determined by EDAX. The estimated thickness of this membrane, from mass gain, is 7 µm. The ideal $H_2/N_2$ selectivity using stainless steel compression fittings and graphite ferrules for this membrane ranged from 1020 at 100 psi to 1320 at 10 psi.

An additional PdAu/alumina composite membrane (GTC-75) was prepared that was similar to GTC-31. The estimated thickness of GTC-75 is 5 microns from mass gain. From EDAX, this membrane had an average Au content of 15 mass %.

Permeation studies with a simulated equilibrium mixture from the water gas shift containing 51% $H_2$, 26% $CO_2$, 21% $H_2O$, and 2% CO were performed with PdAu membrane GTC-75 at a total pressure of 72 psia at 400° C. The membrane area for GTC-75 was 10 cm$^2$. When mixture experiments with the WGS feed containing 2% CO were repeated with this membrane, essentially no inhibition or reduction of the hydrogen flux was observed. Going from a pure $H_2$ feed to the WGS mixture where the hydrogen partial pressure in the feed gas was held constant, there was no change in the hydrogen flux. For example, the pure $H_2$ flux measured for GTC-75 when the feed pressure was 25 psig was 0.22 mol/m$^2$s.

The total permeate flux as well as the CO and $CO_2$ compositions in the permeate for membrane GTC-75 for a variety of feed gas mixtures was determined and is shown graphically in FIG. 1. The first feed gas mixture tested was the water gas shift mixture containing 51% hydrogen at 72 psia pressure. The permeate flux was 0.2 mol/m$^2$ s at a hydrogen partial pressure difference of approximately 25 psi. This was essentially the same flux measured for pure hydrogen at a similar temperature and $H_2$ partial pressure. The CO composition in the permeate was 180 ppmv and the average $CO_2$ composition was approximately 0.5%. The permeate hydrogen purity was 99.5%.

When 1 ppmv $H_2S$ was added to the water gas shift mixture, there was a 23% reduction in the permeate flow or hydrogen flux. The inhibition, or reduction in hydrogen flux due to $H_2S$, increased to 38% when the $H_2S$ feed composition was increased to 5 ppmv. The 23% flux reduction for the PdAu membrane with 1 ppm $H_2S$ is considerably less than the 38% drop in $H_2$ flux we previously observed for a $Pd_{93}Cu_7$ alloy composite membrane tested at 350° C. with the same feed composition. Also, the H2 flux for GTC-75 without sulfur was almost twice that of the $Pd_{93}Cu_7$ membrane even though the $H_2$ partial pressure difference was about 20% of the prior case.

Figure 2:
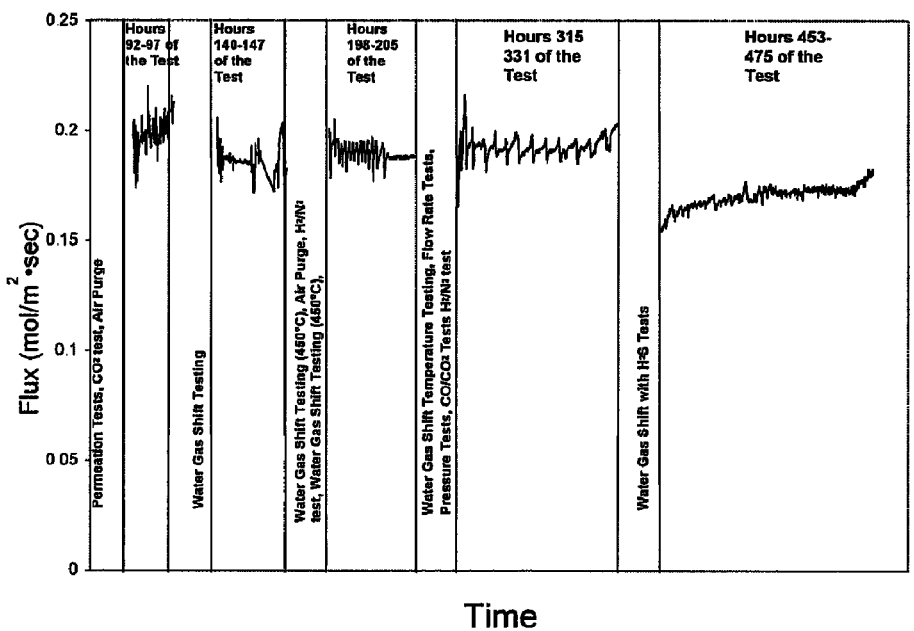
FIG. 2 shows the effect of time on the permeate flow rate from PdAu composite membrane GTC-75 at 400° C. The water gas shift mixture contained 51% $H_2$, 26% $CO_2$, 21% $H_2O$, and 2% CO. Typical feed pressure was 60 psig.

A plot showing the stability of the hydrogen flux of membrane GTC-75 is shown in FIG. 2. Noise in the data shown in FIGS. 1 and 2 were caused by difficulties in controlling pressure when steam was present. The stability of the hydrogen flux of membrane GTC-75 was tested for 475 hours (or 20 days) continuously and ultimately, about a 10% reduction in flux (from 0.2 to about 0.18 mol/m$^2$s) was observed. When the membrane was removed from the test module after 20 days of testing, the surface appeared unchanged from the sulfur exposure, and was palladium colored and shiny. An SEM image of the surface of the membrane after testing showed no pores formed on the membrane surface.

Two summarize these results, two PdAu composite membranes supported on 0.2 micron porous alumina tubes were fabricated by sequential electroless plating and annealing and tested with pure $H_2$, a water gas shift mixture, and the WGS mixture containing 1 ppmv and 5 ppmv $H_2S$. No flux reduction was observed for the WGS mixture compared to a pure $H_2$ feed gas at the same 25 psig partial pressure. A typical pure H2 flux was 0.8 mol/m$^2$s for a 100 psig $H_2$ feed gas pressure at about 400° C. A 23% and 38% decrease in the flux for the gas mixtures containing 1 ppmv and 5 ppmv sulfur, respectively, were observed, but in both cases the membrane achieved a stable flux for over 100 hours of testing. A 99.5% pure $H_2$ stream was produced from the WGS mixture.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of fabricating a sulfur-resistant composite metal membrane comprising:
   seeding a surface of a substrate with palladium(II) crystallites deposited from a palladium(II)—containing salt solution;
   decomposing any organic ligand present on the substrate;
   reducing the palladium(II) crystallites to metallic palladium;
   depositing a first film of palladium metal on the substrate;
   depositing a second film of gold on the first film; and
   annealing the metal films at a temperature between about 200° C. and about 1200° C. to form a sulfur-resistant composite PdAu membrane.

2. The fabrication method of claim 1, wherein a combined thickness of the first film and the second film is between about 2µm and about 10µm.

3. The fabrication method of claim 1, wherein the substrate is a stainless steel support having a porous $ZrO_2$ coating.

4. The fabrication method of claim 1, wherein at least a portion of the substrate has been sealed with a low temperature glaze.

5. The fabrication method of claim 1, wherein the seeding step comprises airbrushing the palladium(II) salt containing solution onto the surface of the substrate.

6. The fabrication method of claim 5, wherein the palladium(II) salt containing solution is a solution consisting of Palladium (II) Acetate and chloroform.

7. The fabrication method of claim 1, wherein the decomposing step comprises firing the substrate comprising the palladium(II) crystallites at an elevated temperature sufficient to eliminate the any organic ligand present on the substrate.

8. The fabrication method of claim 1, wherein the reducing step comprises immersing the substrate in a reducing solution.

9. The fabrication method of claim 8, wherein the reducing solution is a solution consisting of water, $NH_3OH$ and hydrazine.

10. The fabrication method of claim 1, wherein the depositing the first film of palladium metal step comprises pumping a palladium plating bath over the surface of the substrate.

11. The fabrication method of claim 10, wherein the palladium plating bath is a solution consisting of water, $NH_3OH$, HCl, Palladium (II) chloride and hydrazine.

12. The fabrication method of claim 10, wherein the pumping continues until a palladium layer having a thickness of between about 1 μm and about 7 μm is formed.

13. The fabrication method of claim 1, wherein the depositing the second film of gold step comprises pumping a gold plating bath over the surface of the substrate.

14. The fabrication method of claim 13, wherein the gold plating bath is a solution consisting of water, NaOH and gold (III) chloride.

15. The fabrication method of claim 14, wherein the pumping continues until a gold layer having a thickness of between about 1 μm and about 7 μm is formed.

16. The fabrication method of claim 1, further comprising depositing a third film of silver on the second film of gold.

17. The fabrication method of claim 16, wherein the step of depositing a third film of silver comprises pumping a silver plating bath consisting of silver nitrate, $NH_3OH$ and water over the surface of the substrate.

* * * * *